UNITED STATES PATENT OFFICE.

OLE I. THORSEN, OF SEATTLE, WASHINGTON.

PREPARATION OF FOODSTUFFS.

1,164,034.     Specification of Letters Patent.     Patented Dec. 14, 1915.

No Drawing.     Application filed February 16, 1915. Serial No. 8,558.

*To all whom it may concern:*

Be it known that I, OLE I. THORSEN, a citizen of the United States, and a resident of Seattle, in the county of King and State of Washington, have invented certain new and useful Processes in the Preparation of Foodstuffs, of which the following is a full, true, and exact specification.

My invention relates to prepared food stuffs, and has for its principal object; to provide food stuffs of novel and peculiar mixture, extremely nutritious and cheap to produce, and which can be used as a meat substitute, the improved product having qualities equal to the various canned meats and other similar foods now in general use.

The invention will be fully described and explained in the following specification and particularly pointed out in the appended claim.

In the practice of my invention, I use fish, and especially certain grades or kinds of fish that have been heretofore little used as an edible and which are, therefore, very cheap, such for example as hump back salmon, dog salmon, etc., which are to be found in profusion in many parts of the world, but especially in waters of the Northwest Pacific and tributaries. Such fish, if prepared in the general manner of preparing many other kinds of fish, such for example as sockeye salmon, king salmon, etc., do not especially appeal to the palate nor do they compare favorably in general appearances with such fish as sockeye, small salmon and like fish, and for these reasons such fish as hump backs, dog salmon, etc., referred to above, are little used as an edible and are therefore, exceedingly cheap, being practically a waste at the present time.

In preparing my improved meat substitute, I mix a suitable quantity of fish last mentioned, with milk, eggs, common table salt and potato flour, in the following proportions, viz: To produce, say approximately ten pounds of the finished product, I use about 5¾ pounds of any of these cheap grades of fish, first cleaning the fish in the ordinary manner, and then also being careful to see that the fish are free from bones, etc. I then soak the fish thus prepared, in water from six to eight hours, grind and work the mass to the consistency of paste. I then add about $\frac{1}{12}$ of a pound of mixed whites and yolks of eggs, about $\frac{1}{12}$ pound of potato flour, about $\frac{1}{12}$ pound of common salt and lastly, add about 4 pounds of milk, gradually pouring the milk, thoroughly agitating the mass until thoroughly mixed and of about uniform color and general appearance. Suitable quantities from this mass are then placed in ordinary cans, such for example as are generally used in the ordinary fish canning process. The cans thus filled are heated in any suitable manner such as immersing of the same in a fluid of sufficient temperature to produce a steaming of the contents of the cans, the steam venting itself through the usual small aperture in the can, and then afterward sealing the aperture so as to leave partial vacuum within the can and above the preserved product. Any suitable seasoning may be used, such as nutmeg or the like, or the seasoning may be left until the product is served.

My improved food stuff above fully described, will keep for an indefinite time and effectually takes the place of meat foods, is cheap, tasty and very nutritious.

While I have described and explained a particular mode of manufacturing my improved product, and have referred to particular kinds of fish and other ingredients, I am aware that many minor changes will readily suggest themselves to others skilled in the art without departing from the general scope and spirit of the invention, and I therefore desire to avoid being limited to the exact means hereinabove set forth.

Having described my invention, what I claim as new and desire to protect by Letters Patent, is—

In a meat substitute, the combination of fish, milk, eggs, salt and potato flour substantially as set forth as and for the uses and purposes stated.

OLE I. THORSEN.

Witnesses:
    FRANK H. FOWLER,
    WINIFRED KNOPH.